United States Patent
Fennema et al.

(10) Patent No.: US 12,231,832 B2
(45) Date of Patent: Feb. 18, 2025

(54) METHOD FOR PRE-CALCULATING AND APPLYING OPTIMIZED PHASE PATTERNS TO LCOS SWITCH PANEL OF WSS MODULE

(71) Applicant: II-VI Delaware, Inc., Wilmington, DE (US)

(72) Inventors: Alan A. Fennema, San Jose, CA (US); Haijun Yuan, Dublin, CA (US); Wilfredo C. Nanita, Broken Arrow, OK (US); Oswald Correya, Melbourne (AU); Jack R Kelly, Lake Mary, FL (US); Thomas J. Schwartz, Scotts Valley, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 251 days.

(21) Appl. No.: 17/822,306

(22) Filed: Aug. 25, 2022

(65) Prior Publication Data
US 2024/0073566 A1 Feb. 29, 2024

(51) Int. Cl.
*H04Q 11/00* (2006.01)
*G02B 5/32* (2006.01)

(52) U.S. Cl.
CPC .......... *H04Q 11/0003* (2013.01); *G02B 5/32* (2013.01); *H04Q 2011/0028* (2013.01)

(58) Field of Classification Search
CPC .............................. H04Q 11/0003; G02B 5/32
USPC .......................................................... 398/75
See application file for complete search history.

(56) References Cited

U.S. PATENT DOCUMENTS

| | | | |
|---|---|---|---|
| 5,706,067 A | 1/1998 | Colgan et al. | |
| 7,417,706 B2 | 8/2008 | Holmes | |
| 7,457,547 B2 | 11/2008 | Frisken et al. | |
| 8,078,019 B2 | 12/2011 | Cohen et al. | |

(Continued)

FOREIGN PATENT DOCUMENTS

| | | | | |
|---|---|---|---|---|
| GB | 2506745 A | * | 4/2014 | ............... H04J 14/02 |
| KR | 20180000783 A | * | 10/2018 | |
| WO | WO-0125848 A2 | * | 4/2001 | ............... G02B 5/32 |

OTHER PUBLICATIONS

Chen et al; Non-iterative phase hologram generation with optimized phase modulation; Apr. 2020; Optics Express; pp. 1-13. (Year: 2020).*

*Primary Examiner* — Amritbir K Sandhu
(74) *Attorney, Agent, or Firm* — Blank Rome LLP

(57) ABSTRACT

Advanced hologram techniques pre-calculate holograms to be displayed on an LCoS switch panel of a wavelength selective switch (WSS) module. The holograms are generated offline and are then stored on the WSS module for later retrieval. Each of the holograms is associated with a defined parameter, such as an attenuation level, and each of the holograms is configured to create a reconfigurable phase grating profile or pattern of the pixels of the LCoS switch panel. Each phase pattern selectively directs desired diffraction orders of optical channels from the LCoS switch panel for output to selected ports and selectively directs undesired diffraction orders away from the ports and at a desired attenuation level. During operation, the WSS module can retrieve the stored holograms. Interpolation can determine intermediate holograms between parameter values, and a ramp function can be added to the pattern to account for steering adjustments.

25 Claims, 11 Drawing Sheets

(56) References Cited

U.S. PATENT DOCUMENTS

| | | |
|---|---|---|
| 8,525,772 B2 | 9/2013 | Tanaka et al. |
| 8,643,822 B2 | 2/2014 | Tan et al. |
| 8,867,917 B2 | 10/2014 | Frisken et al. |
| 8,977,079 B2 | 3/2015 | Mclaughlin |
| 9,041,897 B2 | 5/2015 | Yuan et al. |
| 9,380,361 B2 | 6/2016 | You et al. |
| 9,521,473 B2 | 12/2016 | Wagener |
| 9,547,276 B2 | 1/2017 | Collings et al. |
| 9,588,300 B2 | 3/2017 | Nakajima et al. |
| 9,632,391 B2 | 4/2017 | Wagener et al. |
| 2016/0139559 A2 | 5/2016 | Holmes |
| 2020/0264558 A1 | 8/2020 | Gao et al. |
| 2022/0253017 A1* | 8/2022 | Kim .................. G02B 27/0944 |
| 2023/0393445 A1* | 12/2023 | Chen .................. H04Q 11/0005 |

* cited by examiner

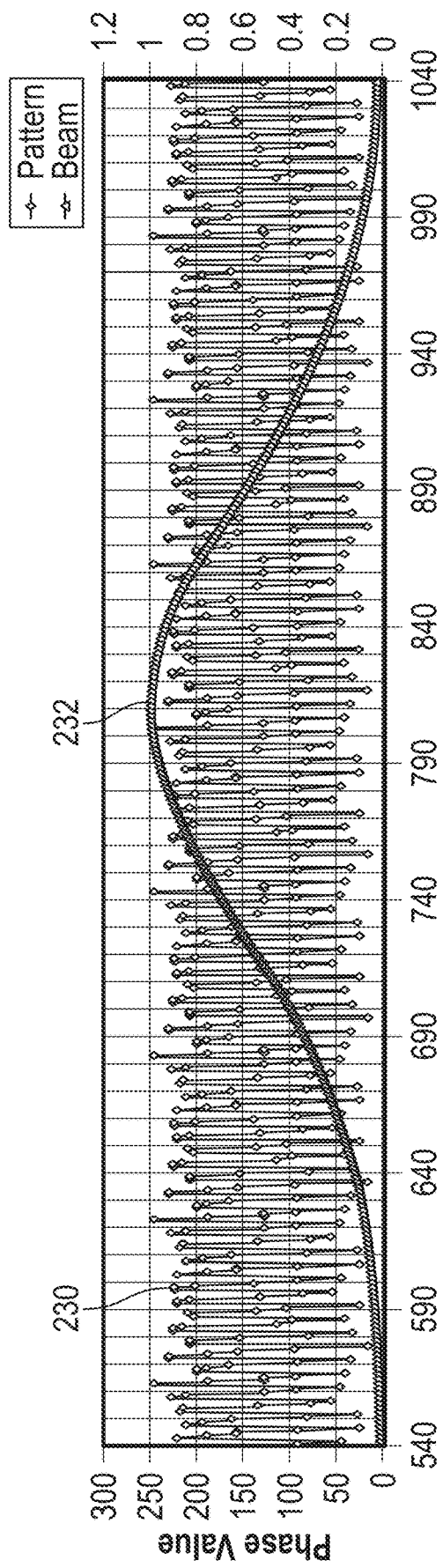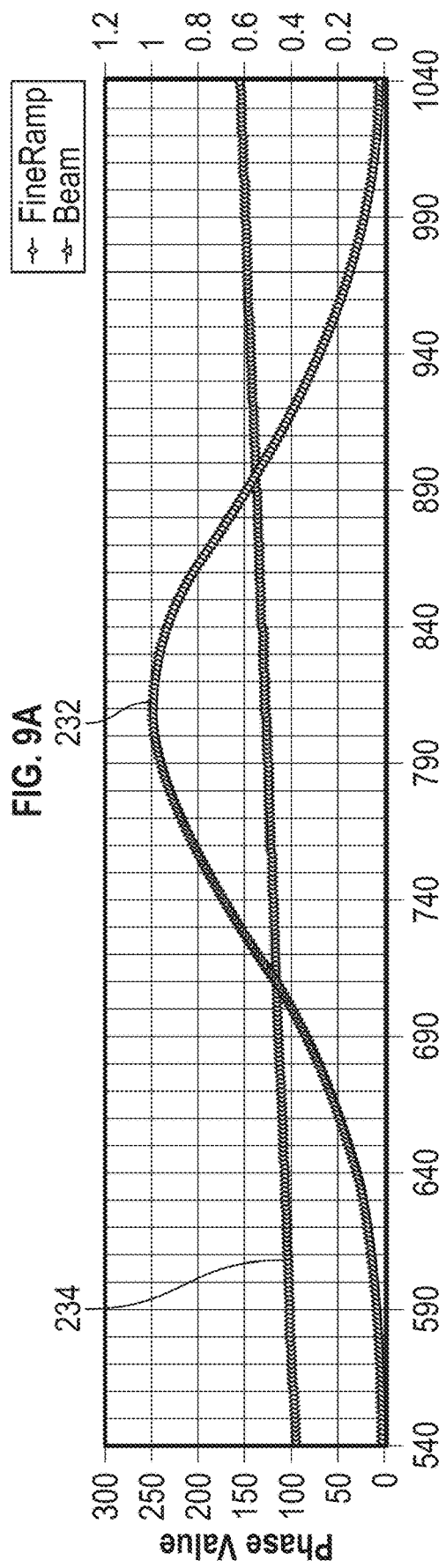
FIG. 9A
FIG. 9B

METHOD FOR PRE-CALCULATING AND APPLYING OPTIMIZED PHASE PATTERNS TO LCOS SWITCH PANEL OF WSS MODULE

BACKGROUND OF THE DISCLOSURE

A wavelength selective switch (WSS) module is used in the art to select wavelengths for optical channels. In general, the WSS module can have a fiber array, various imaging optics, a diffraction grating, and a switch assembly. In general, the switch assembly can be based on a MEMS system, a liquid-crystal-on-silicon (LCoS) switch assembly, a liquid-crystal (LC) switch assembly, or another technology. In current WSS modules, the incident angle of the input light is usually controlled using an LCoS or LC switch panel for the switch assembly.

The LCoS switch panel uses phase patterns to steer desired diffraction orders to desired ports and to direct unwanted diffraction orders away from ports. For example, the LCoS switch assembly can selectively direct individual wavelength division multiplexing (WDM) channels entering the module's input port to any of the module's output ports using holograms or phase patterns on the LCoS switch panel controlled by a software configuration. The control is usually based on a 'disperse-and-select' optical design. In particular, the WDM channels from the input port are diffracted by a static grating along the dispersion axis at the plane of the LCoS switch panel. Diffractive phase patterns (i.e., holograms) displayed on corresponding areas of the LCoS switch panel can then switch the channels to target output ports.

Because the LCoS switch panel has a limited number of pixels available, the WSS module uses anamorphic optics to convert the beams of the individual WDM channels into an elongated shape at the LCoS switch panel. Consequently, the module's output ports are arranged along a switching axis, which is orthogonal to a dispersion axis of the beams. In this configuration, undesirable diffraction orders produced from the LCoS switch panel can be directed along this switching axis and can cause crosstalk between ports. This is especially true when the WSS module has a high port count.

Existing solutions for producing the phase patterns on the LCoS switch panel include using a classic blazing pattern or using real-time phase pattern processing. Using the classic blazing phase pattern to steer beams to desired ports requires significant testing to be performed within an iterative calibration process to achieve marginal results. LCoS-based WSS modules that use the blazing phase patterns may not provide the port isolation performance that customers require. Pixelized phase and pixel interaction result in unwanted diffraction orders of light that can couple into undesirable ports of the WSS module. Fixed blazing phase patterns do not control these effects.

The WSS real-time phase pattern processing currently used in the industry processes higher-order holograms. Optimizing phase pattern parameters takes an extremely long time during WSS module calibration, and the processing requires powerful computation and large data storage on the WSS module during operation. Therefore, performing this processing in real-time can be prohibitively expensive and complex on a WSS module. For this reason, the complexity of achieving WSS real-time phase pattern processing is limited by the hardware available for the WSS module.

The subject matter of the present disclosure is directed to overcoming, or at least reducing the effects of, one or more of the problems set forth above.

SUMMARY OF THE DISCLOSURE

An apparatus is disclosed herein for processing an input beam. The apparatus comprises a plurality of ports, a dispersion element, a switch assembly, and control circuitry. The ports are separated by port spacing, and at least one of the ports is configured to transmit the input beam. The dispersion element is arranged in optical communication with the input beam from the at least one port and is configured to disperse the input beam into optical channels. The switch assembly is arranged in optical communication with the optical channels from the dispersion element. The switch assembly is liquid crystal based and has a plurality of individually addressable pixels.

The control circuitry is arranged in operational communication with the switch assembly. The control circuitry stores a plurality of holograms, each of which is associated with a defined parameter. Each of the holograms is configured to create a reconfigurable phase grating profile of the pixels of the switch assembly. Each of the reconfigurable phase grating profiles is configured to selectively direct a portion of one or more diffracted beams of one or more of the optical channels from the switch assembly relative to one or more of the ports. The control circuitry is configured to select at least one of the holograms based on the defined parameter and is configured to control the switch assembly based on the at least one selected hologram.

A wavelength selective switch for processing an input beam can include the above-described apparatus.

A method is disclosed herein for processing an input beam. The method comprises: transmitting the input beam from at least one port of a plurality of ports, the ports being separated by port spacing; dispersing the input beam into optical channels with a dispersion element; storing a plurality of holograms, each of the holograms associated with a defined parameter, each of the holograms configured to create a reconfigurable phase grating profile of individually addressable pixels of a switch assembly; selecting at least one of the holograms based on the defined parameter; and selectively directing a portion of one or more diffracted beams of one or more of the optical channels relative to one or more of the ports by individually addressing the pixels of the switch assembly according to the at least one selected hologram.

Another method is disclosed of configuring a module to process an input beam. The method comprises: modeling a plurality of ports and a switch assembly of the module, the switch assembly arranged in optical communication with optical channels, the switch assembly being liquid crystal based and having a plurality of pixels, the pixels being individually addressable; determining a plurality of holograms for operating the switch assembly, each of the holograms associated with a defined parameter and each configured to create a reconfigurable phase grating profile of the pixels, by iteratively simulating diffractions of the optical channels from the switch assembly with the reconfigurable phase grating profile, comparing each of the simulated diffractions against a target performance at the defined parameter, and adjusting the reconfigurable phase grating profile of the pixels based on the comparison; and storing the plurality of determined holograms with the defined parameters associated therewith as data accessible by the module.

The foregoing summary is not intended to summarize each potential embodiment or every aspect of the present disclosure.

BRIEF DESCRIPTION OF THE DRAWINGS

FIGS. 9A-9C illustrates a graph of a phase pattern and a fine ramp phase profile with phase values for each pixel.

DETAILED DESCRIPTION OF THE DISCLOSURE

A. WSS Module

Figure 1:
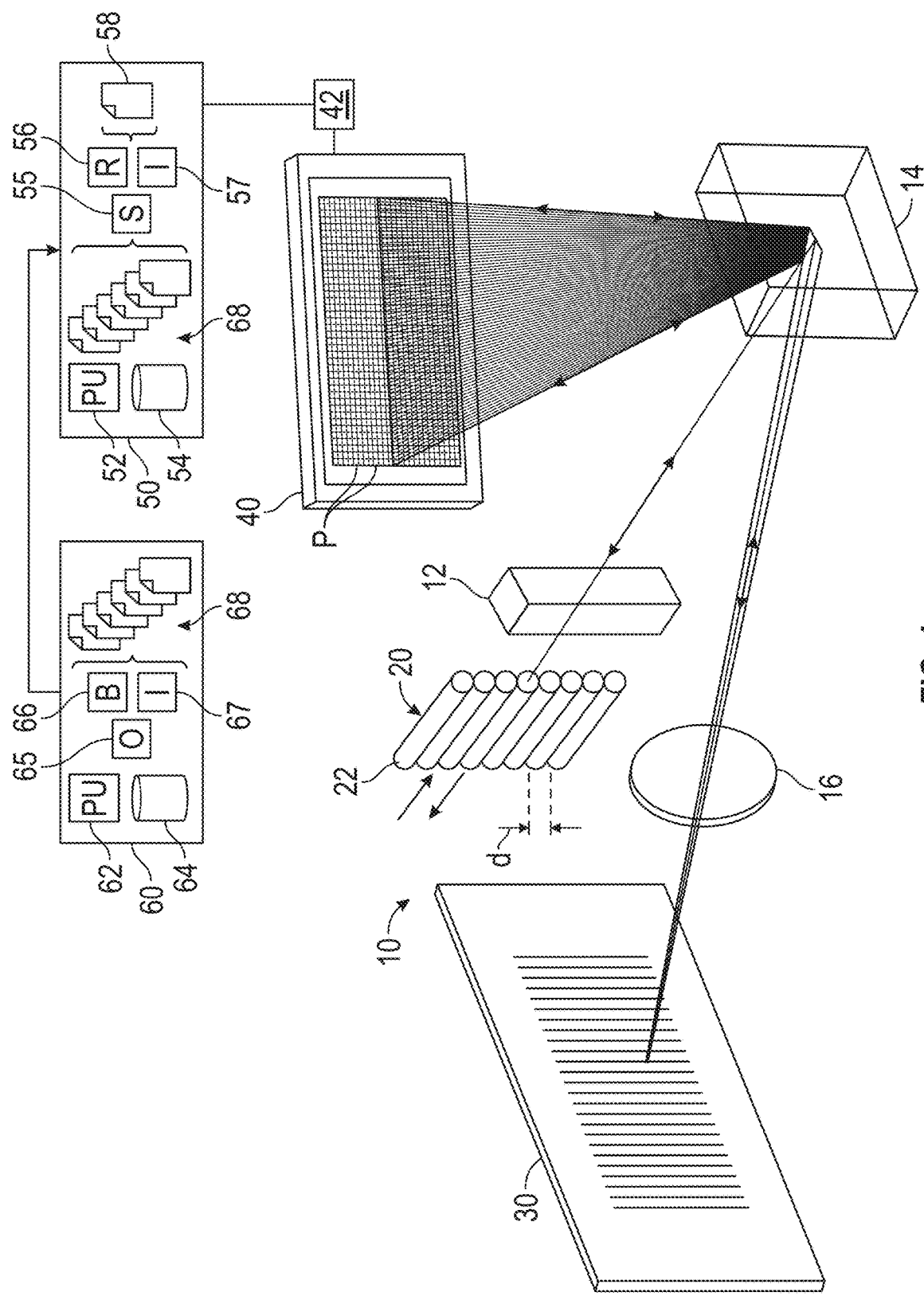
FIG. 1 illustrates a schematic view of a wavelength selective switch (WSS) module according to the present disclosure.

FIG. 1 illustrates a schematic perspective view of a wavelength selective switch (WSS) module 10 according to the present disclosure. In general, the WSS module 10 has a fiber array 20, polarization diversity optics 12, an imaging mirror 14, imaging optics 16, a dispersion element 30, and a switch assembly 40. The fiber array 20 includes input/output fibers for input/output ports 22 of the WSS module 10.

During operation, the input/output ports 22 transmit and receive optical signals, which can be collimated by collimators (not shown). The collimators may be an aspherical lens, an achromatic lens, a doublet, a GRIN lens, a laser diode doublet, or a similar collimating lens. For example, an input signal passes from an input port 22 through the polarization diversity optics 12, which control the polarization of the signals and minimize polarization-dependent effects. The input signal is then directed to the dispersion element 30, which spatially separates the constituent wavelength channels of the input signal. The dispersion element 30 can be a diffraction grating as shown or can be some other element, such as a prism.

The spatially separated wavelength channels are then focused onto the switch assembly 40, which can selectively direct the spatially separated wavelength channels for eventual passage to selected ones of the output ports 22. The switch assembly 40 includes at least one switch engine being liquid crystal based. For example, the switch assembly 40 in FIG. 1 is a liquid-crystal-on-silicon (LCoS) assembly (e.g., LCoS switch panel as referenced herein). The imaging mirror 14 and other imaging optics 16 manipulate the optical signals for appropriate incidence onto the diffraction grating 30 and the LCoS switch panel 40.

The WSS module 10 in FIG. 1 is presented as an example. Other WSS modules according to the present disclosure may have different configurations. In some implementations of the WSS module 10, the polarization diversity optics 12 can separate the input signal into two co-polarized beams, and an anamorphic optic can expand the input signal into an elliptical beam spot onto the dispersion element 30. In turn, the dispersion element 30 can spread the input signal into angularly separated wavelengths, and a Fourier lens can transform the angular separation to spatial separation directed to the LCoS switch panel 40, which has a reconfigurable phase grating profile (also referred to herein as a "phase pattern") that modulates the light. Different wavelengths of light are projected into different parts of the LCoS switch panel 40. In the return, the dispersion element 30 recombines all of the different wavelengths diffracted by the LCoS switch panel 40 onto individual output ports 22. In this way, different wavelengths of the optical signal can be selectively directed to selected ones of the output ports 22.

Figure 2:
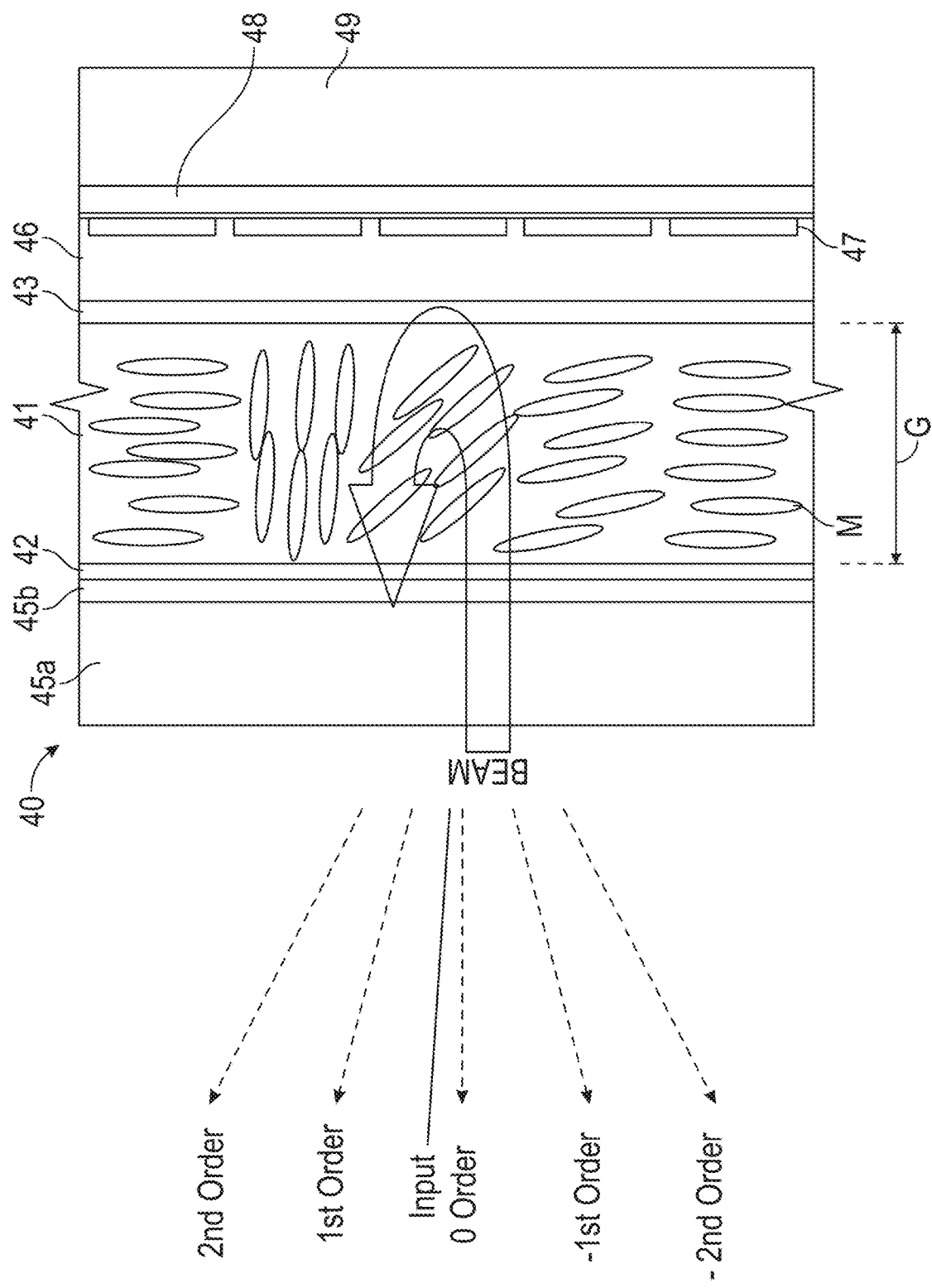
FIG. 2 illustrates a diagram of diffraction orders from a phase grating profile of an LCoS switch panel.

In general and as described in more detail in FIG. 2, the LCoS switch panel 40 has liquid crystal (LC) material sandwiched between a transparent glass layer (having a transparent electrode) and a silicon substrate. The transparent glass layer has a transparent electrode. The silicon substrate has a two-dimensional (2D) array of pixels P and has CMOS circuitry (not shown) used for individually driving the pixels P. A voltage signal provides a local phase change to an optical signal, thereby offering a two-dimensional array of phase manipulating regions that creates the phase pattern of the LCoS switch panel 40.

The electrodes for the pixels P can be finely patterned. The separation between pixels P can be very small, and the LC material can be a continuous medium in the LCoS switch panel 40. The electric field applied by the pixel's electrodes to the birefringent LC material varies the orientation of the crystals to direct the path of an optical beam.

During use, each pixel P can be electronically addressed/controlled on an individual basis so the pixel P can cause local phase retardation. The phase pattern produced by the pixels P of the LCoS switch panel 40 can then diffract all or a part of the light. For example, the phase pattern of the LCoS switch panel 40 can diffract light to one or more of the output ports 22 or can diffract light to a dumped position between the output ports 22 for blocking or attenuating the light.

The individually addressable nature of the LCoS pixels P allows a dynamic phase pattern to be created, which selectively steers each wavelength channel to a desired output port 22 and which also modifies the spectral shape of the channels to perform various optical manipulation effects. In this way, individual spectral components spatially separated by a diffractive element, such as the diffraction grating (30), can be manipulated at predetermined regions of the LCoS switch panel 40 depending on the LC material's birefringent state of the associated region.

When operated, the LCoS switch panel 40 displays a hologram of the phase pattern to steer an input beam toward a position in an input/output plane. The hologram preferably covers a sufficient number of periods of a grating profile so that the input and output beams at the input/output plane can be sufficiently separated. Because the phase pattern displayed on the LCoS switch panel 40 is quantized due to its pixelated nature, the actual diffraction efficiency of the phase pattern can depend on the number of pixels P within a given period. The signals incident on the LCoS switch panel 40 will be reflected at various diffraction orders due to the phase pattern of the LCoS switch panel 40.

B. Diffraction Orders of LCoS Switch Panel

For example, FIG. 2 illustrates a diagram of some of the diffraction orders from the phase pattern produced by the LCoS switch panel 40, which is shown in a simplified side view.

As shown here and briefly noted above, the LCoS switch panel 40 includes a liquid crystal layer 41 disposed in a cell gap G between alignment layers 42 and 43. A cover glass 45a and transparent electrode 45b are positioned next to the alignment layer 42. Meanwhile, a CMOS circuit substrate 46 is positioned adjacent to the opposite alignment layer 43. The CMOS circuit substrate 46 has a plurality of pixel electrodes 47, which are separately addressable and are arranged in a desired two-dimensional array. A reflective lower surface 48 of the CMOS circuit substrate 46 may be included to improve the optical efficiency of the array.

A control layer 49 provides the electrical interface between the pixel electrodes 47 and an external control structure (not shown) that defines the specific, reconfigurable phase grating profile (phase pattern). The voltages applied to the individual pixel electrodes 47 cause individual molecules M within the liquid crystal layer 41 to rotate and create a specific phase grating profile (phase pattern) displayed on the panel 40 as a hologram that steers a beam toward a selected output port (22; FIG. 1). For example, a corresponding pixel sector (i.e., a portion of a linear pixel array) is controlled via applied electrical signals to display the hologram of the phase pattern that directs/steers the first-order diffracted beam into an output port (22; FIG. 1).

During operation, different voltages are loaded on different individual pixel electrodes 47 of the LCoS switch panel 40. The different voltages correspond to different phase delays due to the birefringent effect of the LC material in the LC layer 41. Accordingly, the LCoS pixel array can be configured to exhibit the properties of a blazed grating. A diffraction angle of incident light may be controlled merely by changing the grating period of this pseudo-blazed grating, which is provided by adjusting the voltages applied to the various LCoS pixels P. This voltage adjustment allows diffracted light to be output at different ports (22) of the WSS module (10), implementing a WSS function.

In general, the phase pattern of pixels P on the LCoS switch panel 40 can create periodic grating holograms corresponding to linear or blazed gratings. For example, a periodic, stepped phase shift profile can be produced across a region of the LCoS switch panel 40 to produce a cumulative phase profile, also referred to as a cumulative steering profile. This steering profile is produced by driving each individual pixel P with a predetermined voltage to provide the desired phase change. The periodic nature of the phase is utilized to reduce the required drive voltage. Therefore, a periodic, stepped voltage signal will produce the periodic, stepped phase shift profile, which in turn produces the cumulative phase profile. When acting on an individual wavelength component, the phase profile provides a steering angle. Accordingly, by proper adjustment of the periodic, stepped phase shift profile, the wavelength components can be selectively directed to a desired one or more of the selected output ports (22).

During operation, however, the phase pattern of the LCoS switch panel 40 naturally creates unwanted diffraction orders. When the input power from a communication port (22) of the WSS module (10) is diffracted by the phase profile of the LCoS switch panel 40, the main power from the input can be switched to the desired output port (22) using first-order diffraction. Due to the imperfections in the phase profile, however, there is always some power at the unwanted diffraction orders, such as second-order diffraction and higher. The second-order diffraction is typically the only order of concern because the power at higher orders can be relatively low in comparison. The second-order diffraction may cause more crosstalk in the ports (22) if the unwanted diffraction orders are steered close to the module's ports (22). (In the discussion that follows, the second-order diffraction is used as an example of the unwanted diffraction orders, but higher orders can also be addressed according to the present disclosure.)

C. Cross-Talk in WSS Module

As noted in the background, accurate alignment of the optical components of the WSS module 10 in FIG. 1 attempts to avoid unwanted diffraction orders from getting into the output ports 22 of the WSS module 10. This alignment process takes time to perform and is fixed after the WSS module 10 is fabricated and sealed. Each WSS module 10 is calibrated under test to account for any differences in manufacturing tolerances and the like. In this way, the particular operation of the WSS module 10 can be characterized. One particular characterization of the WSS module 10 describes the steering gradient of the LCoS switch panel 40 (i.e., the angles associated with diffracted beams from the LCoS switch panel 40 relative to the module's ports 22 and other geometric considerations associated with the manufactured module 10).

Even with proper testing, calibration, and the like, unwanted diffraction orders may hit the output ports 22 and produce crosstalk after the WSS module 10. The WSS module 10 may operate differently under different operating parameters, such as operating temperatures of the module 10, wavelength ranges for the channels, target attenuation levels for the channels, geometric alignment of the ports 22 of the module 10, a steering gradient of the module 10, etc.

In general, crosstalk occurs when unwanted higher-order diffracted light (i.e., other than the first order) is coupled to an output port 22 that has not been purposefully selected in the routing by the WSS module 10. Crosstalk can occur at a component level. For example, the phase pattern of the LCoS switch panel 40 can have diffraction inefficiencies and imperfections that cause higher-order diffracted beams to be unintentionally coupled to output ports 22. Crosstalk produced at the component level can typically be handled through electronic control of the LCoS switch panel 40.

At the module level, crosstalk is produced by the spatial arrangement and optical coupling between the module's components. For example, the positions of the fibers for the output ports 22, the apertures of any lenses, the field spot of light on the LCoS switch panel 40, the pitch of the gratings used, and other spatial characteristics affect the optical coupling in the WSS module 10. The module's spatial arrangement is initially designed to minimize crosstalk so that any coupling efficiency for higher-order diffracted light is preferably low. All the same, any inaccuracies, variations, changes, and the like that occur at the module level can alter the optical coupling between the module's components and produce crosstalk.

Figure 3A:
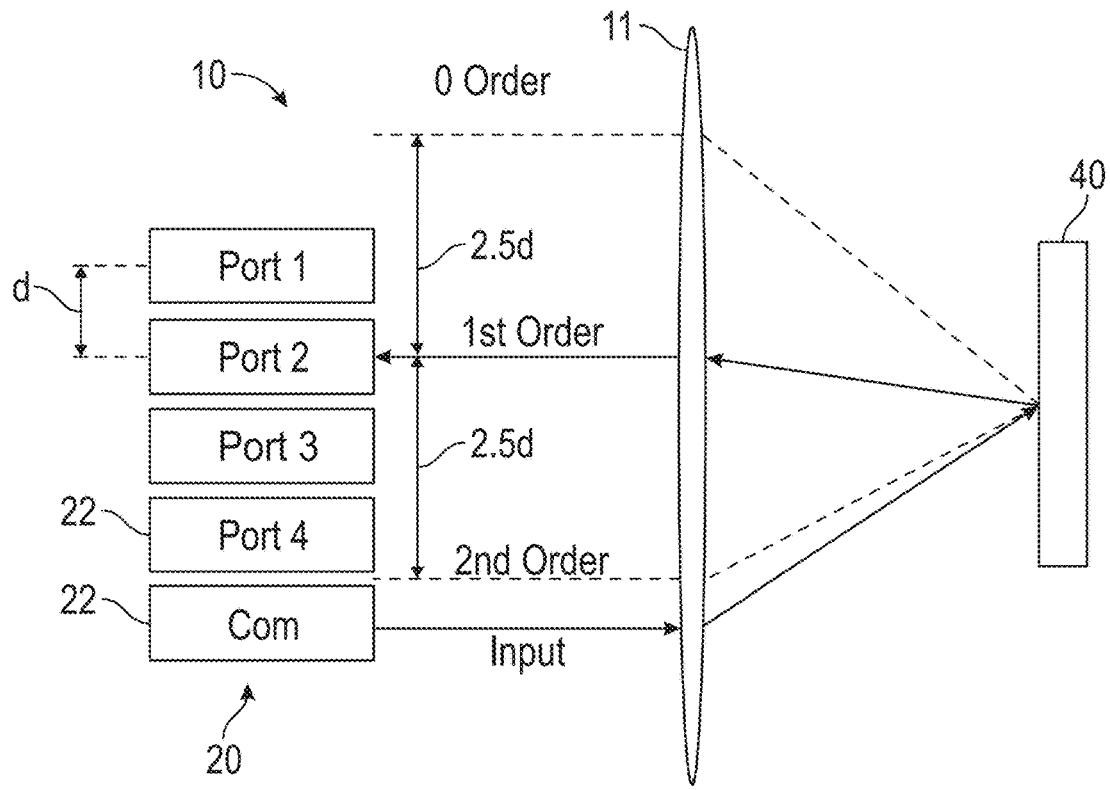
FIG. 3A illustrates a schematic view of a WSS module in a target configuration.
Figure 3B:
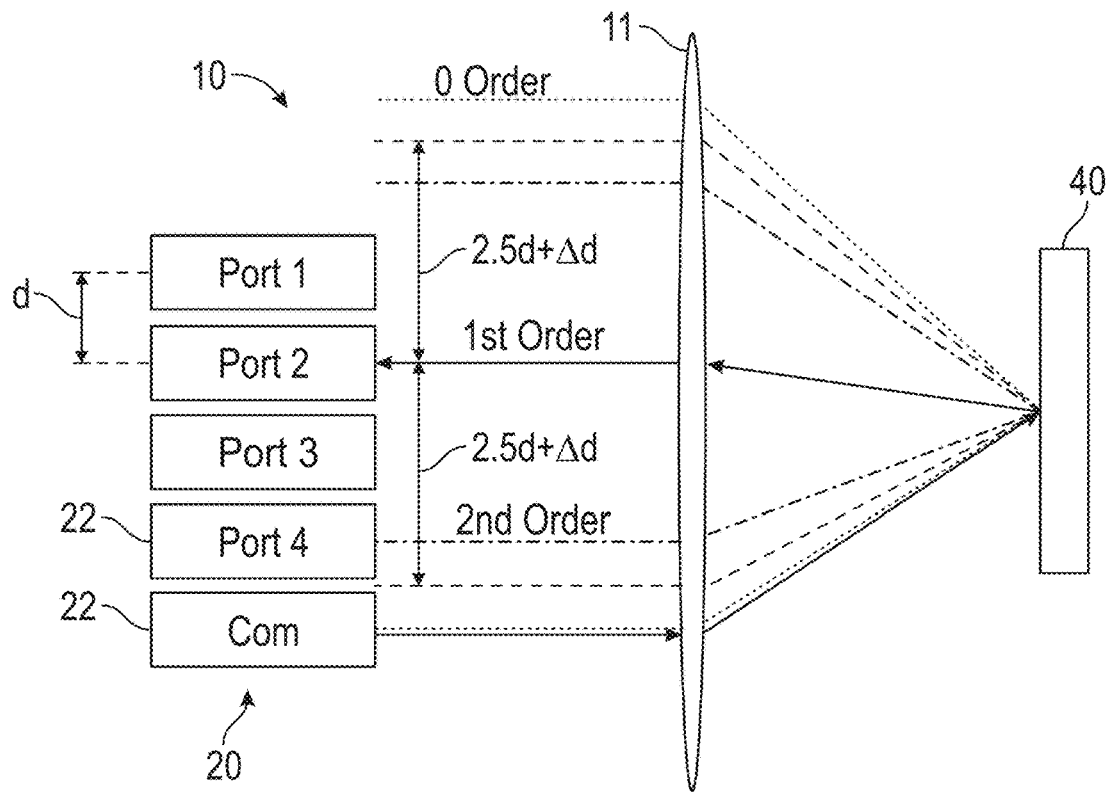
FIG. 3B illustrates a schematic view of the WSS module in a resulting configuration.

To illustrate cross-talk, FIG. 3A illustrates a schematic view of the WSS module 10 having an example target configuration, whereas FIG. 3B illustrates a schematic view of the WSS module 10 in a resulting configuration. The fiber array 20 and the LCoS switch panel 40 are schematically shown. Other elements, such as diffraction grating, optics, and the like, are simply represented as a diagramed feature 11.

An input beam is emitted from a communication port 22 of the fiber array 20. The first-order diffraction beam having the main power from the input beam is intended to be directed to a desired output port 22, such as "Port 2" as shown. In this simplified example, the second-order diffraction beam would be diffracted at 2.5 times the port spacing (d) so as not to be incident at an output port 22 and to avoid crosstalk. (As will be appreciated, the port spacing (d) may typically be set and uniform by design, but this is not strictly necessary as the teachings of the present disclosure can apply to other configurations. In the discussion that follows, uniform spacing (d) is assumed between all ports.)

Changing the beam incident angle on the LCoS switch panel 40 can adjust the relative position between the zero-order diffraction beam and the output ports 22, as well as the relative position between the second-order diffraction beam and the output ports 22. If the position of the zero-order diffraction beam is a half port spacing (d/2) from the output ports 22, then the position for the second-order diffraction beam is also at a half port offset from the output ports. In this way, high port isolation can be achieved.

In actuality, however, the second-order direction beam can shift over half a port distance from the designed target during assembly and use of the WSS module 10. In the worst case, the second-order beam may directly hit one of the output ports 22, producing crosstalk. For example, FIG. 3B shows how the second-order diffraction beam has shifted an amount $\Delta d$ to be incident at least partially at an output port 22 (e.g., Port 4), which produces undesired crosstalk.

D. WSS Module Having Advanced Hologram Processing

Having an understanding of the WSS module 10 and its operation, including the LCoS switch panel 40, phase patterns, holograms, cross-talk, and the like, the discussion now turns to the innovations of the present disclosure, which improve the performance of the WSS module 10.

In particular, techniques disclosed herein optimize the phase pattern applied on the LCoS switch panel 40, which can significantly reduce the amplitude of the unwanted diffraction orders and thus improve the port isolation performance of the WSS module 10. The technique, referred to herein as an "advanced hologram" (AH) technique, is used to optimize the phase patterns generated by the LCoS switch panel 40.

1. Control Circuitry of WSS Module

Returning to FIG. 1, the WSS module 10 includes control circuitry 50 for controlling the operation of the LCoS switch panel 40. Features of the control circuitry 50 optimize the phase pattern applied on the LCoS switch panel 40 so the amplitude of the unwanted diffraction orders can be reduced and so port isolation performance can be improved.

The control circuitry 50 is in operational communication with the LCoS switch panel 40. For example, the control circuitry 50 can be connected to or part of a driver 42, controller, and the like for the LCoS switch panel 40. The control circuitry 50 stores a plurality of holograms 68 (e.g., keyframe holograms), which have optimized phase patterns. (As will be appreciated, each of the keyframe holograms 68 can be stored in any suitable manner for access and retrieval—e.g., as a set, a table, an equation, or other representation of values, such as voltages, for the phase pattern to be applied on the LCoS switch panel 40.) Each of the keyframe holograms 68 is associated with a defined parameter, which is discussed in more detail later. (In one configuration, the defined parameter can be a target attenuation level to be achieved for the channels that are output from the module's ports, but other parameters can also be used.)

Each of the keyframe holograms 68 is configured to create a reconfigurable phase grating profile (also referenced herein as a phase pattern) of the pixels P of the LCoS switch panel 40. Each of the reconfigurable phase grating profiles is configured to selectively direct a portion of one or more diffracted beams of one or more of the optical channels from the LCoS switch panel 40 relative to one or more of the module's ports 22. (For example, first-order diffracted beams are directed to desired output ports 22, while unwanted higher-order beams are directed away from ports 22, such as between ports). During operation, the control circuitry 50 is configured to select at least one of the keyframe holograms 68 based on the defined parameter for output as an output hologram 58 and is configured to control the LCoS switch panel 40 based on the at least one selected output hologram 58.

As generally shown, the control circuitry 50 includes a processing unit 52 and memory 54. The processing unit 52 can use any suitable processor for performing computations associated with (and performed at) the module 10, and the memory 54 can use any suitable type of memory for storing information for the module 10. The memory 54 stores the keyframe holograms 68, and firmware of the control circuitry 50 has various software and functional modules 55, 56, 57 to select, determine, interpolate, etc. the appropriate keyframe hologram 58 to be used for the LCoS switch panel 40 during operation of the WSS module 10.

One of the functional modules 55 can be used to select the output keyframe hologram 58 to be used by the module 10 from the stored keyframe holograms 68. Another of the functional modules 56 can be used to provide fine adjustment on the steering angle of the entire keyframe hologram 58 to achieve optimum performance when applying the determined phase pattern to the given module (10). Yet another of the functional modules 57 can be used to interpolate the output keyframe hologram 58 to be used by the module 10 from the stored keyframe holograms 68. Further details of these functional modules 55, 56, 57 are provided below.

2. Simulations Generating Keyframe Holograms Offline

As noted in the background of the present disclosure, standard blazed phase patterns can have poor port isolation and performance. Also, processing higher-order holograms in real-time requires powerful computation and large data storage for a WSS module, which is not practical in practice. In contrast to these old techniques, the processing of the keyframe holograms 68 disclosed herein is initially computed offline using an external computer system 60. As only generally shown, the external computer system 60 includes an appropriate processing unit 62 and memory 64. The computer system 60 is used for the initial calibration, modeling, and set up of WSS modules. In turn, the particular WSS module 10 is operated and used in the field independently of the system 60. Therefore, the computer system 60 can have more powerful processing and memory functions than used for the WSS module 10.

The computer system 60 uses various software and functional modules 65, 66, 67 to produce the keyframe holograms 68 having the advanced hologram information discussed herein. One of the functional modules 65 simulates and optimizes stepped phase patterns for the keyframe hologram 68, and another of the functional modules uses a blurring function to blur the stepped phase patterns to better simulate the actual operation of the LCoS switch panel 40.

Yet another of the functional modules 67 interpolates between the keyframe holograms 68 for consistency. Further details of these functional modules 65, 66, 67 are provided below.

During the advanced hologram processing techniques, the external computer system 60 generates and stores the keyframe holograms 68 offline. The keyframe holograms 68 include an array of phase patterns for a range of steering angles. Each phase pattern for a steering angle is of an arbitrary length and can be repeated on the LCoS switch panel 40 to produce a full phase pattern when used during operation by the WSS module 10. Additionally, each steering angle contains a limited set of attenuation levels, from near 0 dB to a desired maximum attenuation. These sets of attenuation levels are generated so intermediate attenuation levels can be generated by interpolation of the phase patterns. For example, linear interpolation can be used to interpolate an intermediate hologram between at least two selected holograms. Other, more complex forms of interpolation can also be used.

3. Using the Keyframe Holograms with Control Circuitry

Once they are generated, the keyframe holograms 68 are stored on various WSS modules, such as the given WSS module 10 shown here. For example, the keyframe holograms 68 are stored in the module's memory 54 for later retrieval and use. Then, during operation, the control circuitry 50 of the WSS module 10 obtains a current parameter associated with the WSS module 10. The current parameter may be retrieved from memory, may be received from an external input, or may be associated with a measured characteristic of the WSS module 10. The control circuitry 50 finds at least one of the holograms 68 stored in memory 52 having the defined parameter that is at least associated with the current parameter and retrieves the at least one hologram 68 for use.

Preferably, storing the keyframe holograms 68 on the WSS module 10 requires little storage space in the module 10. In this way, the WSS module 10 does not require increased processing power and large memory, thus achieving a cost-effective solution for the hardware for a WSS module 10. As also noted above, optimizing phase patterns can take an extremely long time during the calibration of a WSS module 10. However, the optimized phase patterns for the keyframe holograms 68 pre-calculated with the disclosed advanced hologram processing techniques can significantly reduce the calibration time for the WSS module 10, thus reducing the product cycle time and cost.

The processing on the computer system 60 uses simulations, multiple iteration loops, a blurring function, and other techniques to simulate the phase and diffraction in an optimization process. For its part, however, the processing performed by the control circuitry 50 involves look-up, selection, comparisons, and other functions. The control circuitry 50 can also perform interpolation to obtain intermediate solutions.

During operation, for example, the control circuitry 50 of the WSS module 10 retrieves these pre-calculated keyframe holograms 68 from storage and uses at least one of them as an output hologram 58 for controlling the LCoS switch panel 40 to provide the desired steering and attenuation. Based on target performance for the WSS module 10, the control circuitry 50 can use the pre-calculated hologram 68 directly for the output hologram 58, or the control circuitry 50 can interpolate the intermediate phase pattern for a new attenuation level or other parameter using the interpolation module 57. To do these operations, the control circuitry 50 requires minimal computation when performing the selections and the interpolations.

Furthermore, the control circuitry 50 can perform angle adjustments particular to the WSS module's calibration by directly adding/subtracting a fine ramp adjustment to the phase pattern using the ramp module 56. In this way, the WSS module 10 can achieve high performance and complexity in the phase patterns that it uses, and the WSS module 10 only needs to perform minimal computations when using the pre-calculated holograms 68. In the end, the disclosed advanced hologram techniques minimize crosstalk and optimize the desired performance of the WSS module 10.

As noted, the control circuitry 50 stores and uses the keyframe holograms 68 having pre-calculated phase patterns to control the LCoS switch panel 40, and the control circuitry 50 can add a phase delta per each pixel P to produce a fine phase ramp. As discussed below, the fine phase ramp adjusts the pre-stored phase pattern to achieve a small, uniform adjustment of the pre-stored phase angle. In this way, the control circuitry 50 can fill in any steering angle gaps between discrete angles used in the pre-calculated phase pattern groups. The control circuitry 50 can perform the above operations to adjust for variations in the WSS module 10 due to environmental changes, such as temperature and orientation. The control circuitry 50 can also perform the above operations on selectable wavelengths and wavelength ranges.

In the advanced hologram processing technique, the phase pattern applied to LCoS switch panel 40 is pixelized. The pixelized voltages are adjusted to optimize the performance, including, but not limited to, the minimization of insertion loss (IL) on each port 22 from the wanted diffraction peak and the port isolation from the unwanted diffraction peaks. To illustrate this, FIG. 4A illustrates a graph 100 of phase versus pixel number for a classic blazing phase pattern according to the prior art, and FIG. 4B illustrates a graph 110 of the magnitude of diffracted beams at different angles produced from the classic blazing phase pattern relative to an example arrangement of ports for a WSS module.

Figure 4A:
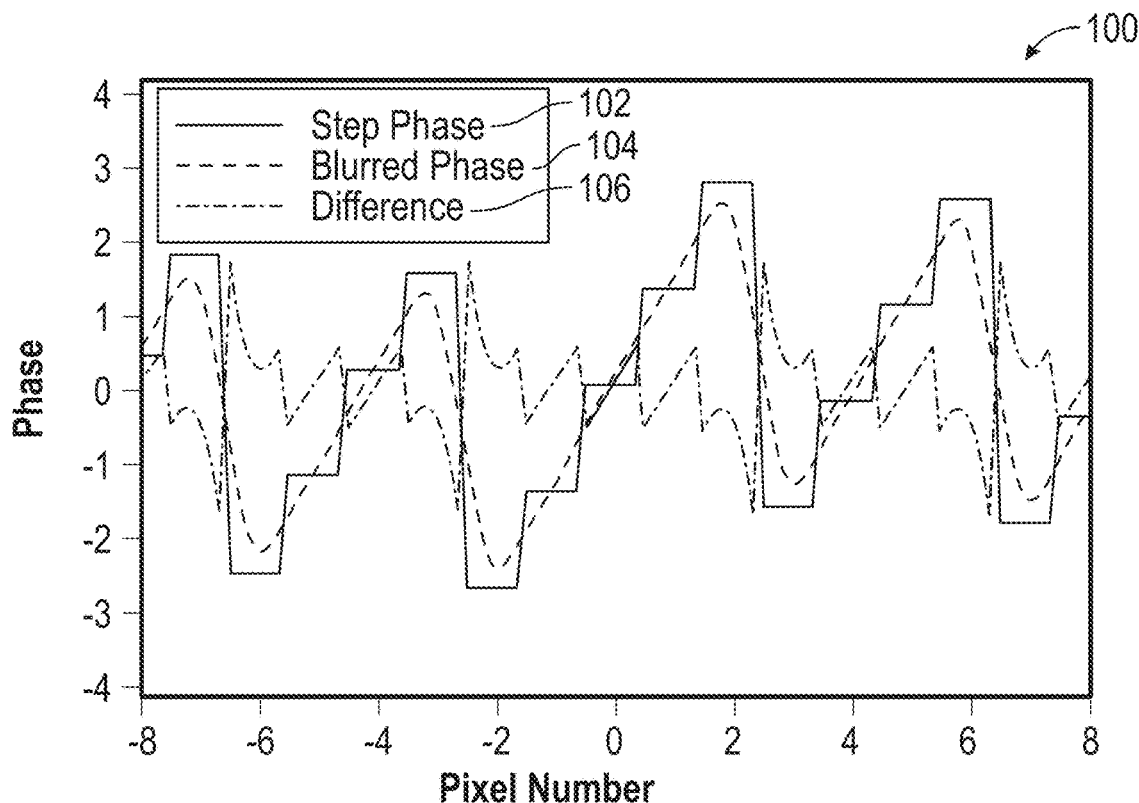
FIG. 4A illustrates a graph of phase versus pixel number for a classic blazing phase pattern according to the prior art.
Figure 4B:
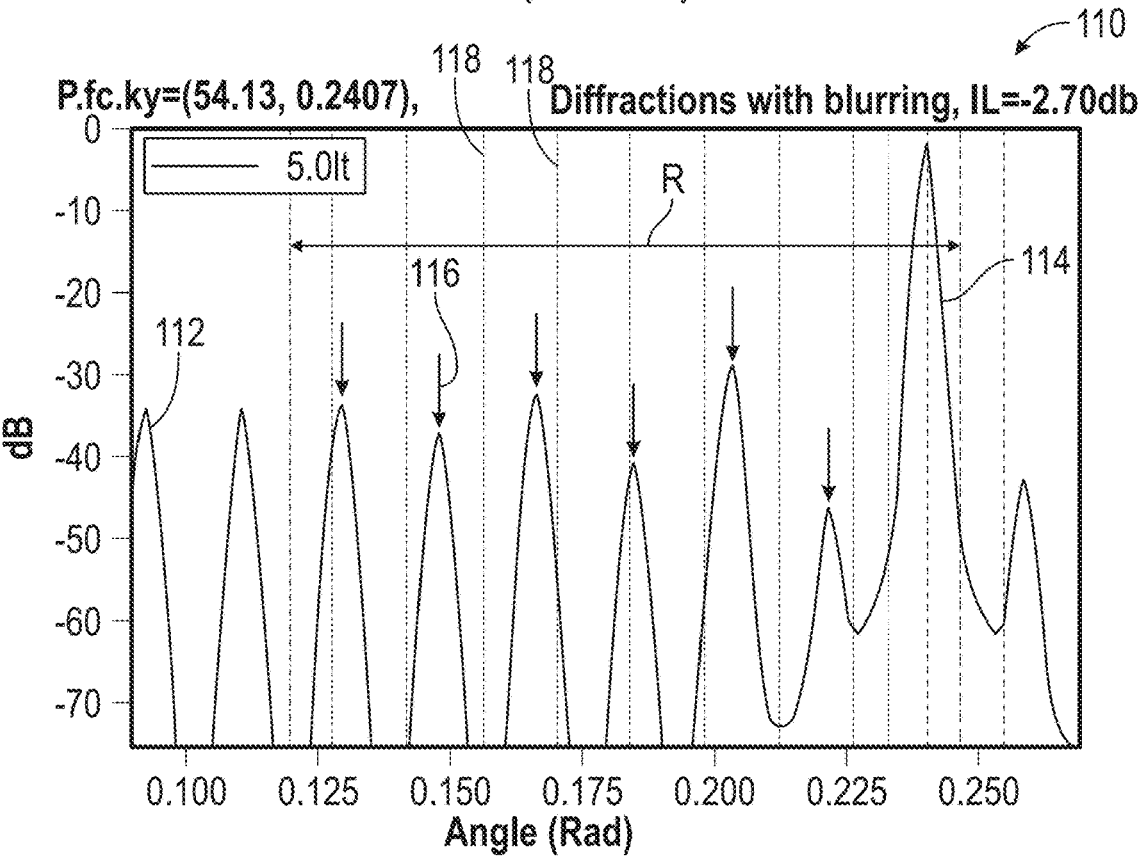
FIG. 4B illustrates a graph of the magnitude of diffracted beams at different angles produced from the classic blazing phase pattern.

As shown in FIG. 4A, the individually addressable pixels of the LCoS switch panel operate at discrete levels so the phase pattern has a stepped phase 102. The phase values for the pixels have uniform steps in this classic blazing phase pattern 102. The stepped phase 102 is shown along with a blurred phase 104 and a phase difference 106.

The diffraction produced from such a phase pattern can be high. As shown in FIG. 4B, the magnitudes (dB) of diffracted beams 112 are shown relative to various steering angles (rad). Locations 118 for the ports in the example WSS module are graphed at their corresponding steering angles. For ease of illustration, port locations 118 for nine ports are used as an example. The output port range (R) covers all output ports of the WSS module.

In this example, a desired diffraction peak 114 is illustrated for a given port (i.e., first port) at one of the port locations 118. For instance, this diffraction peak 114 can correspond to a first-order diffracted beam steered from the LCoS switch panel (40) at the steering angle for the first port location 118 of the WSS module. However, unwanted diffraction peaks 116 (such as from higher-order diffraction beams) are also produced. The unwanted diffraction peaks 116 have a relatively high magnitude in the range of all of the other output port locations 118. These high diffraction peaks 114 would therefore lead to poor port isolation at the port locations 118 and could produce possible cross-talk.

In contrast to the phase pattern of FIG. 4A and the resulting unwanted diffraction peaks of FIG. 4B, the advanced hologram processing technique disclosed herein allows for non-uniform phase steps. In particular, FIG. 5A illustrates a graph 120 of phase versus pixel number for a phase pattern of a keyframe hologram produced according to the present disclosure, and FIG. 5B illustrates a graph 130 of the magnitude of diffracted beams at different angles produced from the phase pattern of FIG. 5A relative to the example arrangement of ports for the WSS module.

Figure 5A:
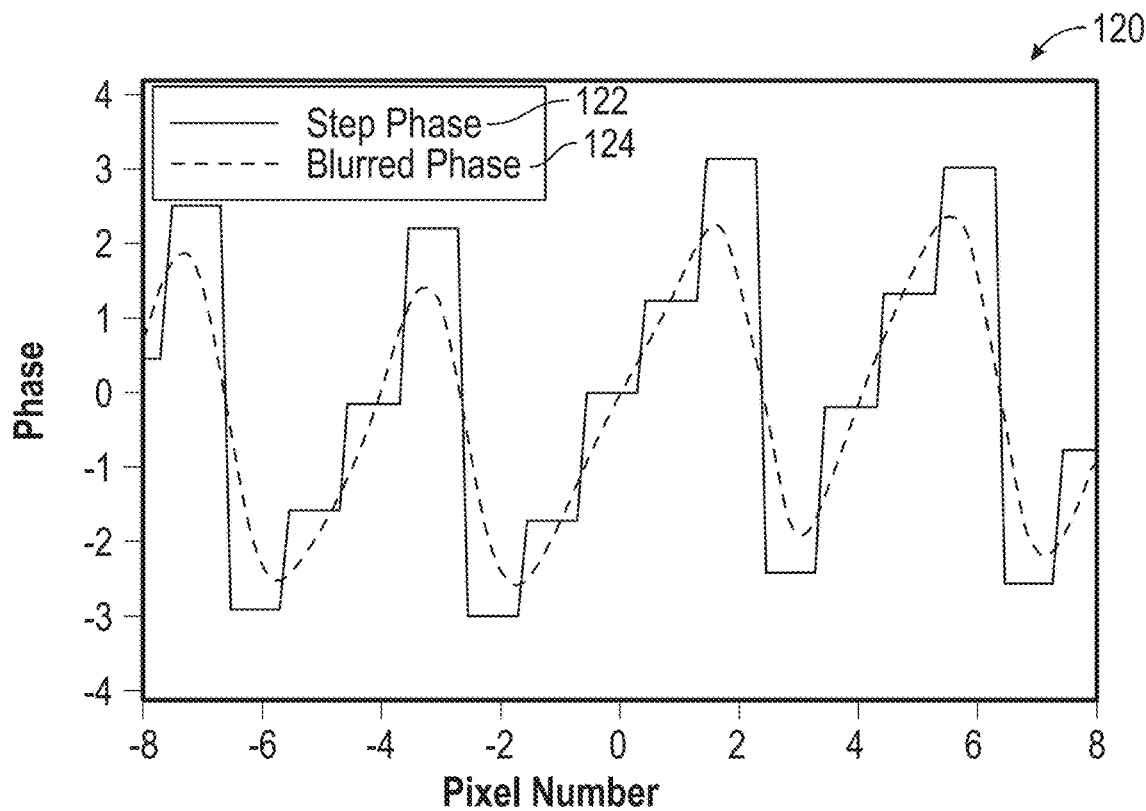
FIG. 5A illustrates a graph of phase versus pixel number for a phase pattern according to the present disclosure.

The phase pattern 112 in FIG. 5A adjusts the phase steps on each pixel to improve performance so that non-uniform phase steps are produced. These non-uniform phase steps are used as variables in the optimization process discussed below.

Figure 5B:
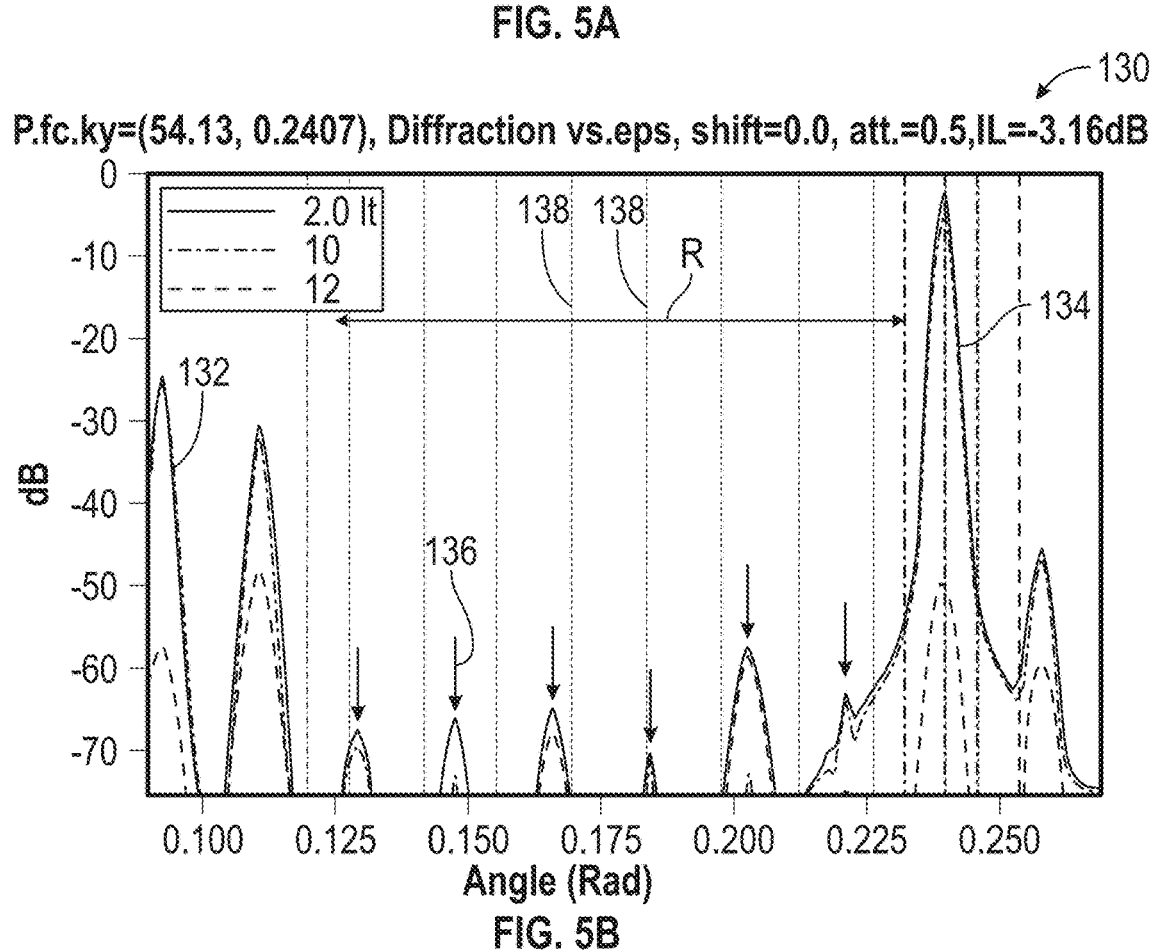
FIG. 5B illustrates a graph of the magnitude of diffracted beams at different angles produced from the phase pattern of FIG. 5A.

FIG. 5B shows calculated diffraction peaks 132 produced by the phase pattern of FIG. 5A optimized using the advanced hologram processing technique. As shown, the magnitudes (dB) of diffracted beams 132 are shown relative to various steering angles (rad). Again, locations 138 for the ports in the WSS module are graphed at their corresponding steering angles, and the output port range (R) covers all output ports of the WSS module.

In this example, the desired diffraction peak 134 is illustrated for the first port at first port location 138. Again, this diffraction peak 134 can correspond to a first-order diffracted beam steered from the LCoS switch panel (40) at the steering angle for the first port location 138 of the WSS module.

As before, unwanted diffraction peaks 136 (such as from higher-order diffraction beams) are also produced. The unwanted diffraction peaks 136 are significantly reduced in the range (R) of all the output port locations 138, while the wanted diffraction peak 134 for the first port remains high. As a consequence, the chances for unwanted cross-talk are reduced because better port isolation can be achieved with a lower magnitude of unwanted diffraction peaks 136.

E. Details of Advanced Hologram Processing Technique

The discussion now turns to a process for performing the advanced hologram processing techniques of the present disclosure to produce keyframe holograms with optimized phase grating profiles of the pixels of an LCoS switch panel.

Figure 6A:
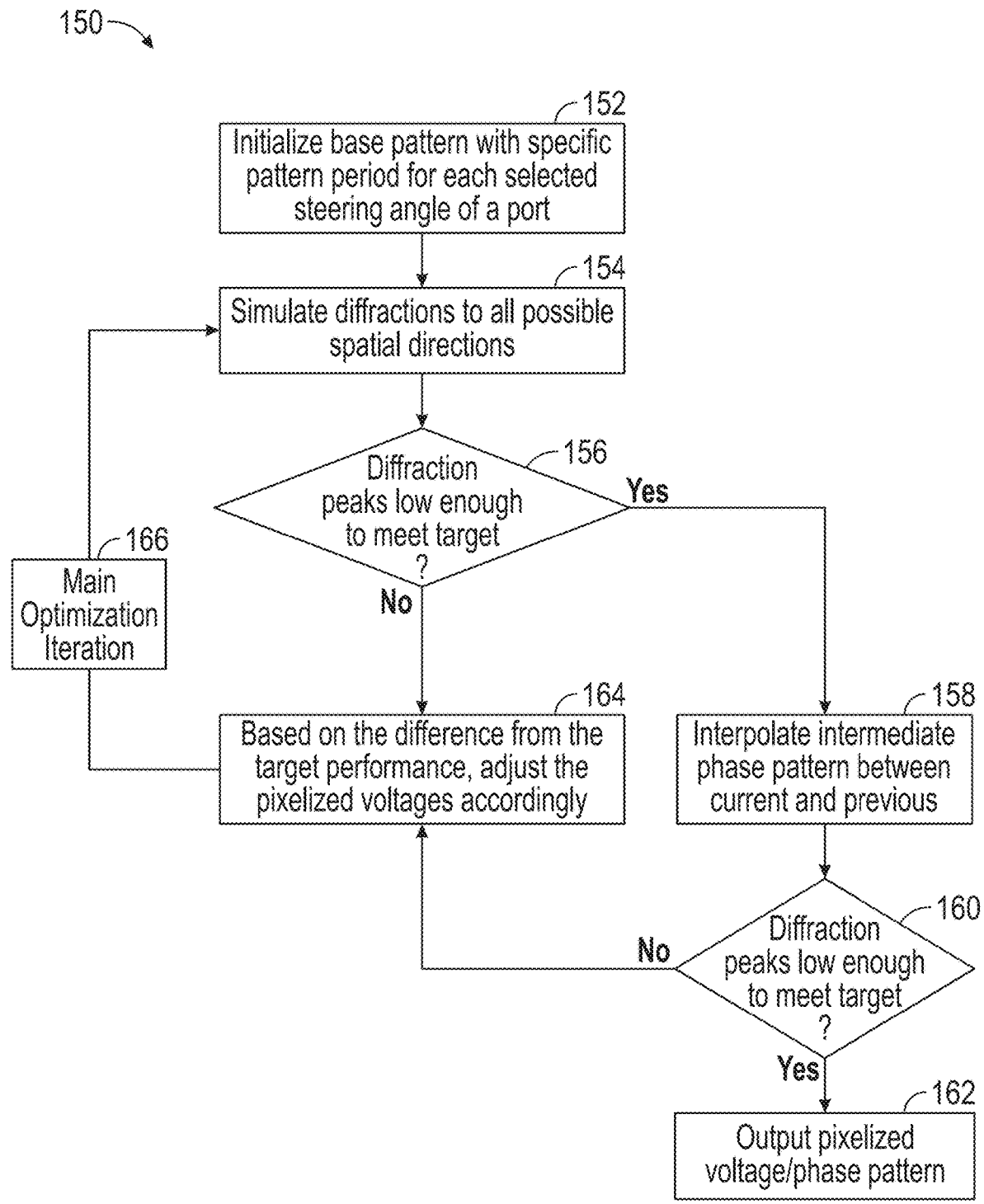
FIG. 6A illustrates a process to determine phase patterns for holograms to be stored for a WSS module.

FIG. 6A illustrates a flowchart of an advanced hologram processing technique 150 to determine phase grating profiles (e.g., phase patterns) of keyframe holograms to be stored for a WSS module. The technique 150 of FIG. 6A is implemented in simulation offline using the external computer system (60) as noted previously.

The main steps of the advanced hologram processing technique 150 are shown in FIG. 6A. First, a base phase pattern with a specific pixel period is initialized according to the design of the underlying WSS module (Block 152). The base phase pattern can be a standard blazing pattern that would be used for the underlying WSS module. Each output port of the WSS module (10) is associated with a specific steering angle of the LCoS switch panel (40), which is further associated with the pattern's period.

The advanced hologram processing technique 150 is performed in a looped fashion with several iterations. The technique 150 simulates diffractions of the beams produced by the subject phase pattern of the LCoS switch panel (40) to all possible special directions (Block 154). At each simulation, the computer system (60) checks if the peaks of unwanted diffraction beams are low enough to meet a target parameter (e.g., a target attenuation level) (Decision 156).

If the diffraction peaks are low enough to meet the target level (Yes at Decision 156), then the computer system (60) can eventually output the pixelized voltages of each pixel for the phase pattern to be used as a keyframe hologram of the present disclosure (Block 162). Before outputting the current keyframe hologram, however, the technique 150 may first check if the current keyframe hologram is suitable for use in interpolations to be performed at the WSS module (10) if necessary. As such, using the current keyframe hologram at a target parameter and using a previous keyframe hologram at an incremented target parameter, the technique 150 interpolates an intermediate phase pattern for an intermediate parameter (Block 158). The technique (158) checks if the peaks of unwanted diffraction beams are low enough to meet the intermediate parameter (e.g., an intermediate attenuation level) (Decision 160). If so (Yet at Decision 160), then the determined phase pattern for the current keyframe hologram at the current parameter can be output for later use by a WSS module (10) during operations. Otherwise, additional iterations are required (No at Decision 160)

As the technique 160 performs the main optimization iterations 166, the diffraction peaks may be determined to be too high to meet the target level (No at Decision 156 or 160). In this case, the pixelized voltages of the current phase pattern are adjusted accordingly based on the difference from the target performance (Block 164), and the main optimization iterations 166 repeat by simulating the diffractions (Block 154), checking the peaks relative to the target parameter (Decision 156), etc.

The main optimization iterations 166 continuously adjust the voltages slightly on each pixel in the period until the diffraction peaks reach the target level. In the end, the phase step for each pixel is output as a keyframe hologram (68) to be used for the WSS module (10). As noted previously in FIG. 1, a set of such keyframe holograms (68) are generated for a set of targets (e.g., attenuation levels) and are stored for use by the WSS module (10).

Figure 6B:
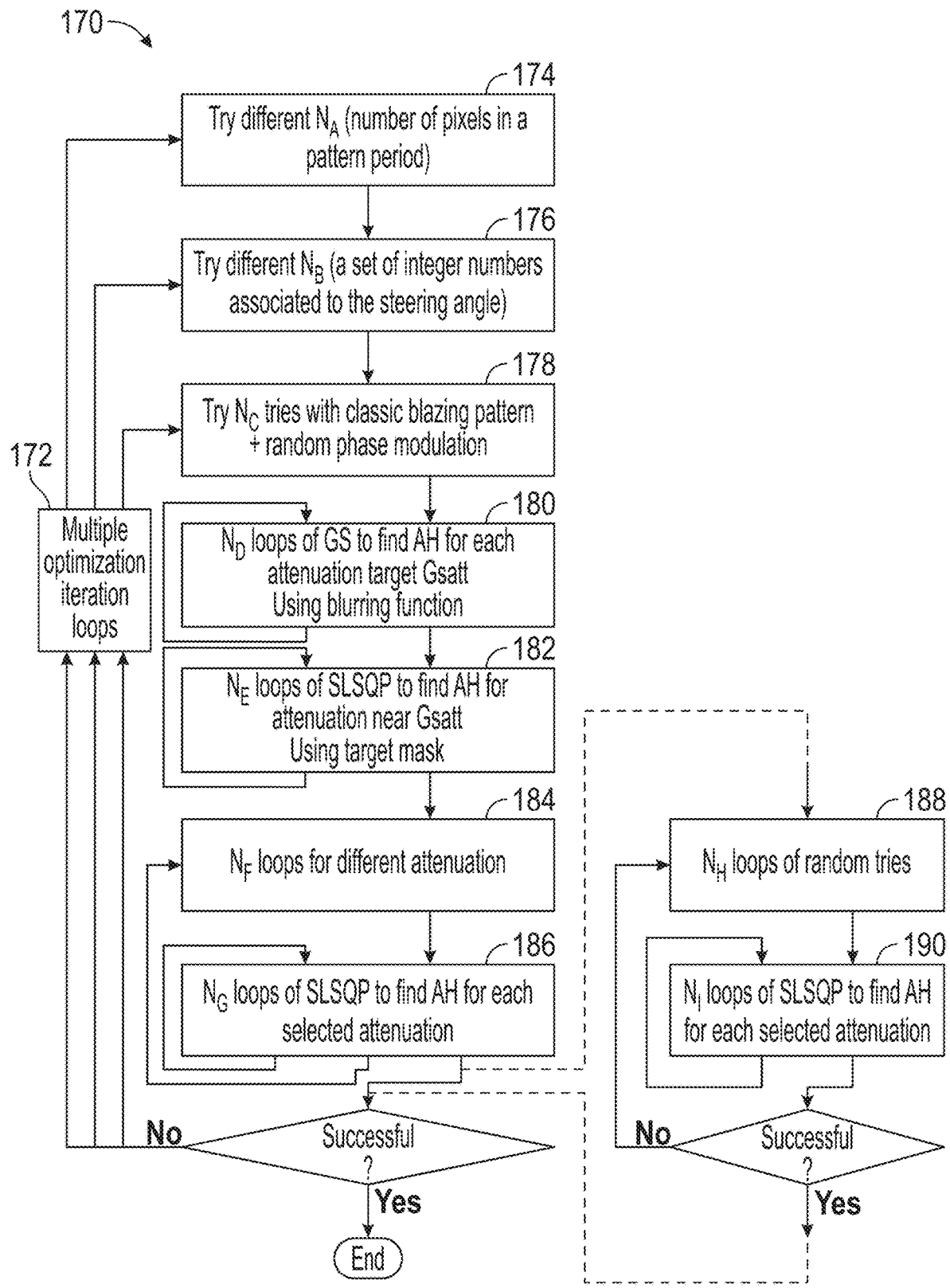
FIG. 6B illustrates a flowchart of more detailed steps of the process in FIG. 6A.

The iterations of the advanced hologram processing technique 150 may contain many subloops, some of which are shown in the flowchart in FIG. 6B. The multiple optimization iteration loops 170 can use any series of optimization sub-loops 170 to provide improved performance and optimization speed of the phase patterns produced. Several generalized sub-loops 172 are shown here as examples. The optimizations include:

Trying different numbers (NA) of pixels in a pattern period (Block 174);

Trying different sets of integer numbers (NB) associated with the steering angles (Block 176);

Trying a number (Nc) of tries with classic blazing pattern and random phase modulation (Block 178);

Performing a number (No) of loops of a Gerchberg-Saxton (GS) algorithm to find a keyframe hologram for each target parameter (e.g., target attenuation GSatt) (Block 180);

Performing a number (NE) of loops of a Sequential Least-Squares Programming Optimization Algorithm (SLSQP) to find a keyframe hologram for a value near the target parameter (e.g., attenuation near GSatt) (Block 182);

Performing a number (NF) of loops for different target levels (e.g., attenuation levels) (Block 184);

Performing a number (NG) of loops of SLSQP to find a keyframe hologram for each selected value of a target parameter (e.g., attenuation level) (Block 186);

Performing a number (NH) of loops of random tries (Block 188); and

Performing a number (Ni) of loops of SLSQP to find a keyframe hologram for each selected target parameter (e.g., attenuation) (Block 190).

Various iterations, numbers of tries, numbers of loops, and order of steps can be used in the iterations of FIG. 6B. The steps presented here are meant to be exemplary. A target mask, range, or list 192 can be used when performing loops at different values of the target parameter. Additionally, a blurring function 194 is used in the simulation loops to better simulate the phase on the LCoS switch panel (40) and their diffractions. (This blurring function corresponds to the blurring module 66 of the computer system 60 in FIG. 1.)

F. Example of Blurring Function

Figure 7:
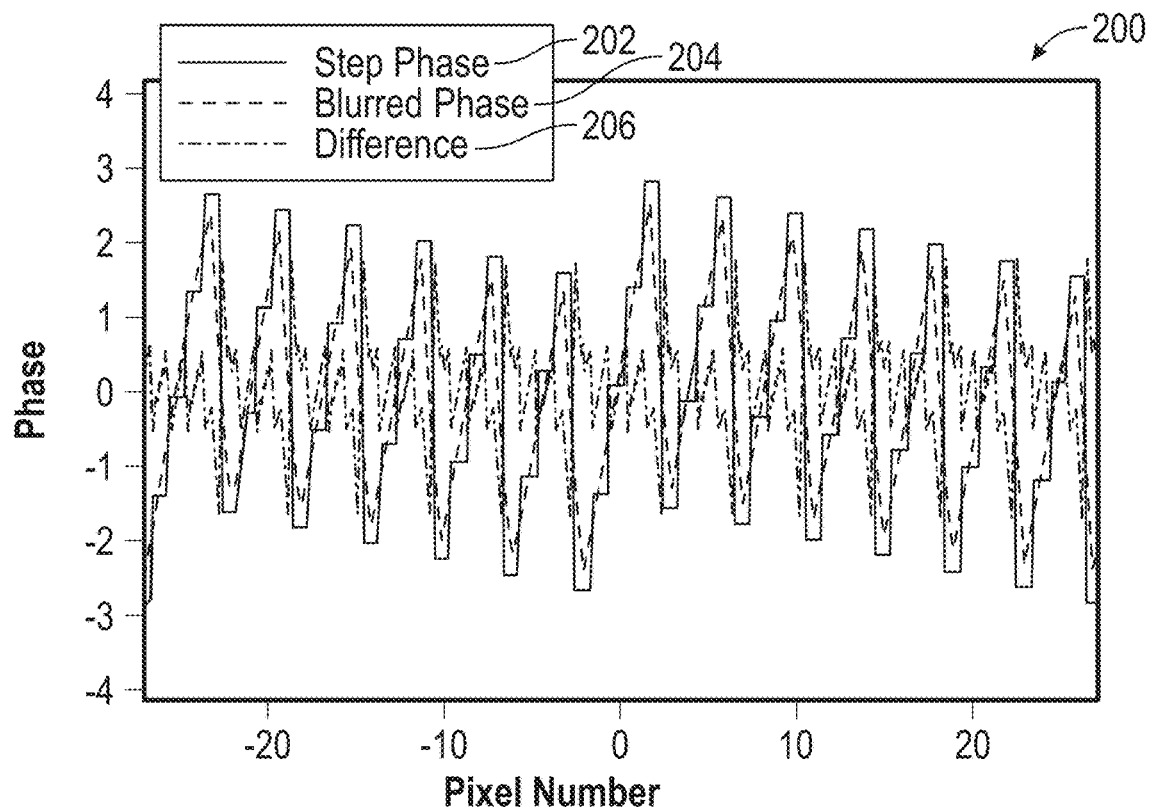
FIG. 7 illustrates a graph of a step phase pattern and a blurred phase pattern for pixels on an LCoS switch panel.

To illustrate the blurring function, FIG. 7 illustrates a graph 200 of a step phase pattern 202 and a blurred phase pattern 204 for pixels (P) on an LCoS switch panel (40). A difference 206 is also graphed. As noted, the LCoS switch panel (40) is a pixelized device, and the voltages for the phase pattern 202 on the panel (40) is a step function. However, the actual phase displayed by the LCoS switch panel (40) is not a step function due to a natural blurring effect of the liquid crystal LC of the LCoS switch panel (40). The degree of blurring depends on LCoS geometry and the material's properties. For this reason, a blurring function is used in the simulations on the stepped phase pattern 202 to produce the blurred phase pattern 204, which better simulates the phase on the LCoS switch panel (40).

As shown in FIG. 7, the blurred phase pattern 204 is produced after the blurring function is used on the stepped phase pattern 202. This blurred phase pattern 204 is used in the diffraction simulations of the advanced hologram processing technique (150) and sub-loop iterations (170) disclosed herein with reference to FIGS. 6A-6B. The blurring function can make the offline simulations closer to the real-world performance of the LCoS switch panel (40) and can significantly reduce the module's calibration time when the module (10) imports the optimized keyframe holograms (68) generated offline.

G. Example of Interpolation Function

As noted previously with reference to interpolation in the advanced hologram processing technique (150) of FIG. 6A, specific correlations can be built for the phase patterns at different parameter values (e.g., attenuation levels) for the defined parameters. This can make interpolation more seamless for any attenuation level. During the iterations of the process (150), a set of phase patterns associated with the keyframe holograms are generated at a few attenuation levels. The process (150) can start with a first keyframe hologram at a 0.5 dB attenuation level and can build keyframe holograms at different increments of the attenuation levels. Both in the interpolation check (Block 158) of the process (150) and the control circuitry (50) of the module (10), intermediate phase profiles for intermediate attenuation levels will use an interpolated pattern from the two adjacent keyframe holograms.

Figure 8A:
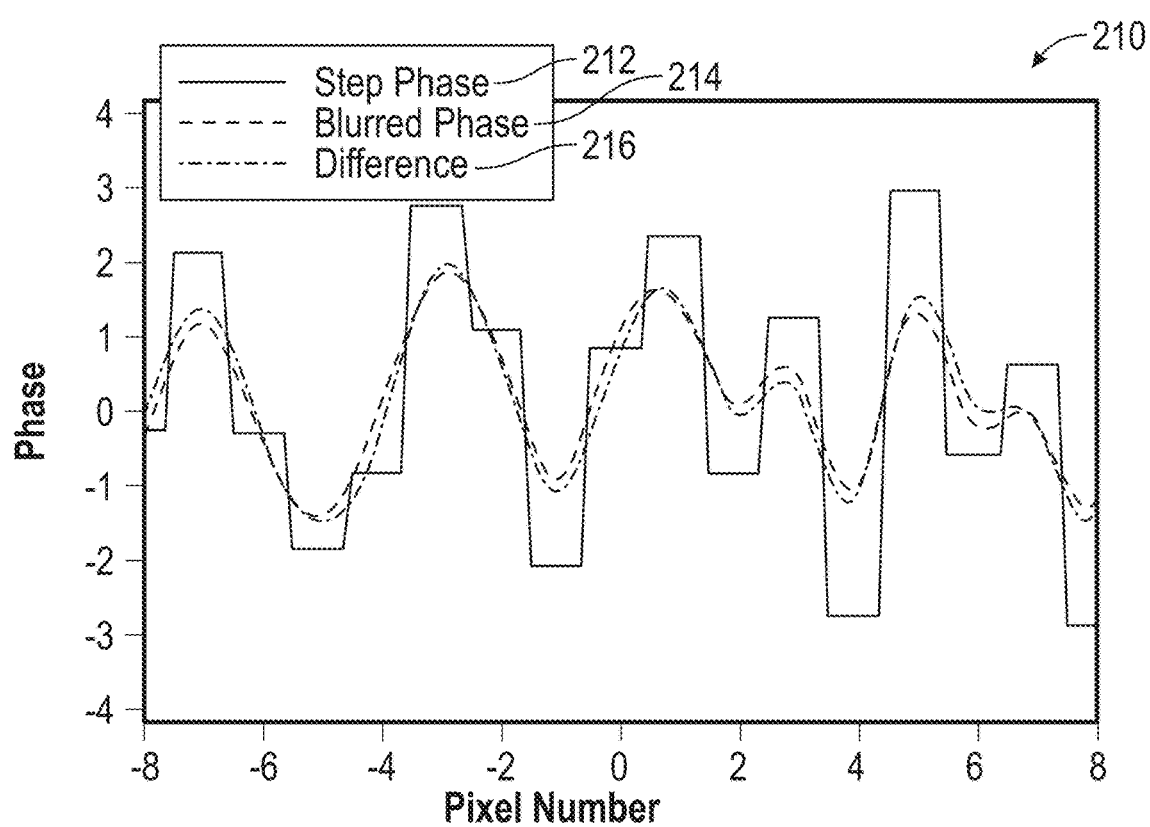
FIG. 8A illustrates a graph of a phase pattern for a stored hologram at a 9.5 dB attenuation level.
Figure 8B:
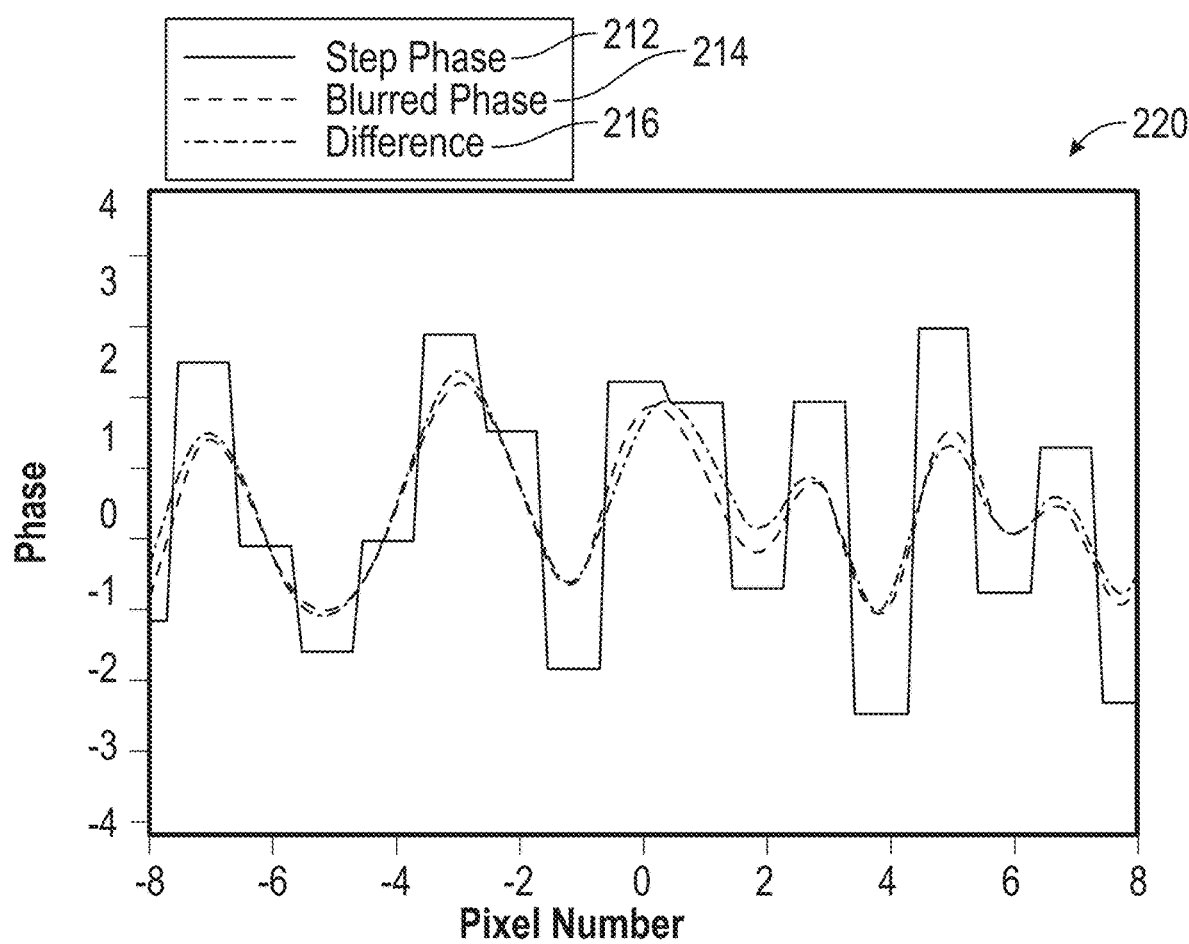
FIG. 8B illustrates a graph of a phase pattern for a stored hologram at 12.5 dB attenuation level.

For example, FIG. 8A illustrates a graph 210 for a keyframe hologram having a stepped phase pattern 212 optimized at a 9.5 dB attenuation level for the defined parameter. Meanwhile, FIG. 8B illustrates a graph 220 of another keyframe hologram having a stepped phase pattern 222 optimized at a 12.5 dB attenuation level. The blurred phase patterns 214, 224 produced by the blurring function disclosed herein are also shown for both keyframe holograms 210, 220 along with the differences 216, 226.

During offline simulations and module operation, an intermediate keyframe hologram can be interpolated between these two keyframe holograms 210, 220. For example, the offline computer system (60) includes the interpolation module (67) configured to interpolate between keyframe holograms and to determine whether the diffraction peaks meet a target attenuation level so the generated keyframe holograms (68) have consistency. Moreover, the control circuitry (50) of the module (10) in FIG. 1 also includes an interpolation module (57) to interpolate between the stored keyframe holograms (68) on the module (10). (As noted, linear interpolation is described, but other forms of interpolation can be used.)

For example, the interpolation module (57) of the control circuitry (50) is configured to select at least two of the keyframe holograms (68) having the defined parameters associated on both sides of an intermediate parameter value. In this case, the interpolation module (57) can select the stored keyframe hologram (FIG. 8A) at the 9.5 dB attenuation level and the stored keyframe hologram (FIG. 8B) at the 12.5 dB attenuation level on both sides of an intermediate parameter value, such as an 11.0 dB attenuation level. The interpolation module (57) can then interpolate an intermediate keyframe hologram between the stored keyframe holograms so the control circuitry (50) can control the LCoS switch panel (40) based on the intermediate hologram (58).

As noted above, the iterative process of FIGS. 6A-6B preferably avoids producing a large change in the phase patterns configured for different parameter values when the module (10) performs interpolation as noted above. For this reason, the iterative process of FIGS. 6A-6B preferably uses the phase pattern from a previously determined keyframe hologram as an initial phase pattern to generate a subsequent keyframe hologram at a new incremented value of the parameter (e.g., attenuation). Thus, during the iterations to optimize the phase patterns for the keyframe holograms, the iterative process of FIGS. 6A-6B can use the phase pattern from the previously determined keyframe hologram at the 9.5 dB attenuation level in FIG. 8A as an initial phase pattern to generate the subsequent keyframe hologram at the new incremented 12.5 dB attenuation in FIG. 8B.

In addition as noted previously, the iterative process (150) of FIGS. 6A-6B preferably includes an additional constraint when generating new keyframe holograms. The performance of an intermediate value of the parameter with an intermediate phase pattern (i.e., (keyframe$_n$+keyframe$_{n+1}$)/2) is checked and used as feedback during the optimization process. Thus, during the iterations to optimize the phase patterns for the keyframe holograms, the iterative process (150) of FIGS. 6A-6B can interpolate an intermediate phase pattern at the 11.0 dB attenuation level from the keyframe holograms at the 9.5 dB and 12.5 attenuation levels in FIGS. 8A-8B. If the performance of the interpolated phase pattern meets the target value, then the determined keyframes can be stored for use. Otherwise, the iterative process (150) of FIGS. 6A-6B would recalculate a new keyframe hologram at the 12.5 attenuation level. In this way, the performance at all of the hologram keyframes at the different values of the parameter can be guaranteed for consistency using interpolation at the module (10) if needed.

H. Example of Fine Ramp Adjustment

As will be appreciated, the port location of each manufactured WSS module (10) can deviate from a designed location due to manufacturing assembly tolerances and the like. Using the fine ramp adjustment module (56), the control circuitry (50) can add or subtract a fine ramp angle to the WSS module's operation to provide fine adjustment on the steering angle of the entire replicated pattern to achieve optimum performance when applying the determined phase pattern from the keyframe hologram 58 to the given module (10).

For example, the control circuitry (50) stores and uses the keyframe holograms (68) having pre-calculated phase patterns to control the LCoS switch panel (40). The control circuitry (50) can add a phase delta per each pixel P to produce a fine phase ramp. In turn, the fine phase ramp adjusts the pre-stored phase pattern to achieve a small, uniform adjustment of the pre-stored phase angle. In this way, the control circuitry (50) can fill in any steering angle gaps between discrete angles used in the pre-calculated phase pattern groups. The control circuitry (50) can perform the above operations to adjust for variations in the WSS module (10) due to environmental changes, such as temperature and orientation. The control circuitry (50) can also perform the above operations on selectable wavelengths and wavelength ranges.

Figure 9C:
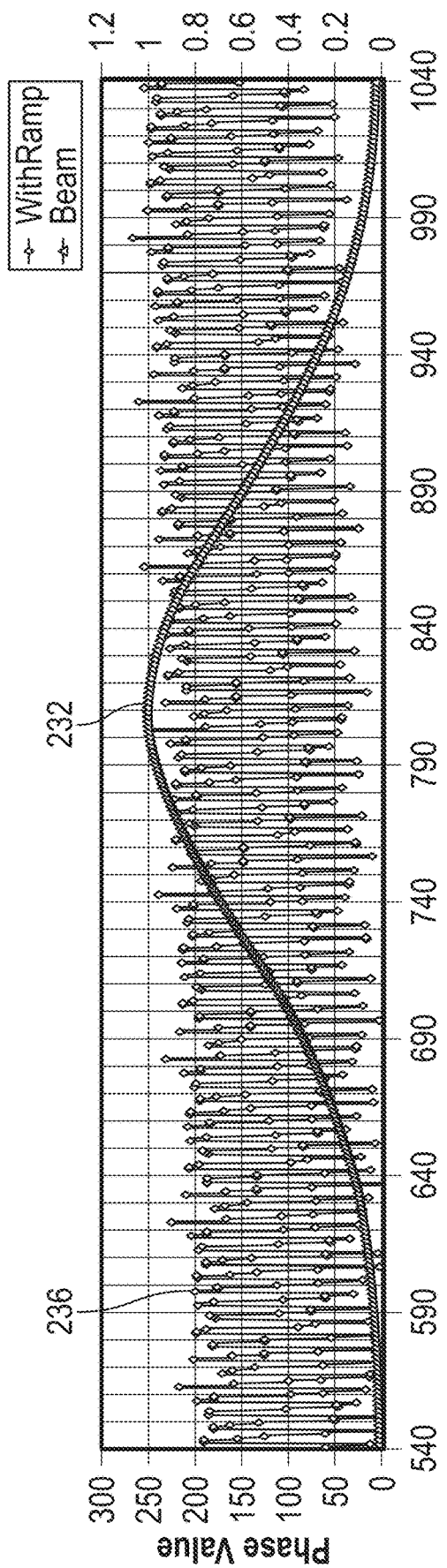

As an example, FIGS. 9A-9C illustrate how an adjustment with a fine ramp can be added to the steering angle of a phase pattern. In FIG. 9A, a phase pattern 230 for a keyframe hologram shows phase values for a group of pixels for the LCoS switch panel. The phase values can range from 0 to 255 for each pixel. For illustrative purposes, the beam profile 232 having a Gaussian distribution produced by the phase pattern is shown. In FIG. 9B, a fine ramp phase 234 is shown for addition to the determined phase pattern 230. Finally, in FIG. 9C, a corrected phase pattern 236 having the fine ramp phase added to it is shown, which can provide a fine adjustment to the steering angle from the LCoS switch panel (40).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for processing an input beam, the apparatus comprising:
   a plurality of ports being separated by port spacing, at least one of the ports being configured to transmit the input beam;
   a dispersion element arranged in optical communication with the input beam from the at least one port and configured to disperse the input beam into optical channels;
   a switch assembly arranged in optical communication with the optical channels from the dispersion element, the switch assembly being liquid crystal based and having a plurality of pixels, the pixels being individually addressable; and
   control circuitry arranged in operational communication with the switch assembly, the control circuitry storing a plurality of holograms, each of the holograms associated with a defined parameter, each of the holograms configured to create a reconfigurable phase grating profile of the pixels of the switch assembly, each of the reconfigurable phase grating profiles being configured to selectively direct a portion of one or more diffracted beams of one or more of the optical channels from the switch assembly relative to one or more of the ports, the control circuitry being configured to select at least one of the holograms based on the defined parameter and being configured to control the switch assembly based on the at least one selected hologram;
   wherein the defined parameter is selected from the group consisting of a targeted attenuation level for the optical channels, a wavelength range for the optical channels, a geometric alignment of the ports of the apparatus, a steering gradient, and an operating temperature of the apparatus.

2. The apparatus of claim 1, wherein one or more of the reconfigurable phase grating profiles include phase values for the pixels having non-uniform steps in a blazing phase pattern.

3. The apparatus of claim 1, wherein the ports comprise fibers of a fiber array, the port spacing being uniform; wherein the dispersion element comprises a diffraction grating; and wherein the control circuitry comprises one or more processing units in operable communication with memory.

4. The apparatus of claim 1, further comprising:
   a lens arranged in optical communication with the dispersion element;
   a polarization optic arranged in optical communication with the ports; and
   an imaging mirror arranged in optical communication between the ports, the dispersion element, and the switch assembly.

5. The apparatus of claim 1, wherein the switch assembly comprises a liquid-crystal-on-silicon (LCoS) switch panel having:
   a transparent layer having a transparent electrode;
   a silicon substrate having electrodes for the individually addressable pixels; and
   a liquid crystal material between the transparent layer and the silicon substrate.

6. The apparatus of claim 1, wherein to selectively direct the portion of the one or more diffracted beams of the one or more of the optical channels from the switch assembly relative to the one or more of the ports, each of the reconfigurable phase grating profiles is configured to:
   selectively direct at least a first order of the one or more diffracted beams from the switch assembly for output to selected one or more of the ports; and
   selectively direct at least a higher order of the one or more diffracted beams from the switch assembly away from the ports.

7. The apparatus of claim 1, wherein to selectively direct the portion of the one or more diffracted beams of the one or more of the optical channels from the switch assembly relative to the one or more of the output ports, each of the reconfigurable phase grating profiles is configured to attenuate the portion to a targeted attenuation level as the defined parameter.

8. The apparatus of claim 1, wherein the control circuitry is configured to:
   obtain a current parameter associated with the apparatus;
   find at least one of the holograms stored in memory having the defined parameter that is at least associated with the current parameter; and
   retrieve the at least one hologram found in memory.

9. A wavelength selective switch for processing an input beam, the wavelength selective switch comprising the apparatus of claim 1.

10. An apparatus for processing an input beam, the apparatus comprising:
- a plurality of ports being separated by port spacing, at least one of the ports being configured to transmit the input beam;
- a dispersion element arranged in optical communication with the input beam from the at least one port and configured to disperse the input beam into optical channels;
- a switch assembly arranged in optical communication with the optical channels from the dispersion element, the switch assembly being liquid crystal based and having a plurality of pixels, the pixels being individually addressable; and
- control circuitry arranged in operational communication with the switch assembly, the control circuitry storing a plurality of holograms, each of the holograms associated with a defined parameter, each of the holograms configured to create a reconfigurable phase grating profile of the pixels of the switch assembly, each of the reconfigurable phase grating profiles being configured to selectively direct a portion of one or more diffracted beams of one or more of the optical channels from the switch assembly relative to one or more of the ports, the control circuitry being configured to select at least one of the holograms based on the defined parameter and being configured to control the switch assembly based on the at least one selected hologram;
- wherein the control circuitry comprises an interpolation module being configured to:
- select at least two of the holograms having the defined parameters associated on both sides of an intermediate parameter value;
- interpolate an intermediate hologram between the at least two selected holograms; and
- control the switch assembly based on the intermediate hologram.

11. An apparatus for processing an input beam, the apparatus comprising:
- a plurality of ports being separated by port spacing, at least one of the ports being configured to transmit the input beam;
- a dispersion element arranged in optical communication with the input beam from the at least one port and configured to disperse the input beam into optical channels;
- a switch assembly arranged in optical communication with the optical channels from the dispersion element, the switch assembly being liquid crystal based and having a plurality of pixels, the pixels being individually addressable; and
- control circuitry arranged in operational communication with the switch assembly, the control circuitry storing a plurality of holograms, each of the holograms associated with a defined parameter, each of the holograms configured to create a reconfigurable phase grating profile of the pixels of the switch assembly, each of the reconfigurable phase grating profiles being configured to selectively direct a portion of one or more diffracted beams of one or more of the optical channels from the switch assembly relative to one or more of the ports, the control circuitry being configured to select at least one of the holograms based on the defined parameter and being configured to control the switch assembly based on the at least one selected hologram;
- wherein the control circuitry is configured to:
- obtain a current parameter associated with the apparatus;
- find at least one of the holograms stored in memory having the defined parameter that is at least associated with the current parameter; and
- retrieve the at least one hologram found in memory;
- and wherein the control circuitry comprises an interpolation module being configured to:
- select at least two of the stored holograms having the defined parameters associated on both sides of the current parameter;
- interpolate an intermediate hologram between the at least two selected holograms; and
- control the switch assembly based on the intermediate hologram.

12. The apparatus of claim 11, wherein to obtain the current parameter, the control circuitry is configured to:
- retrieve the current parameter from memory;
- receive the current parameter from an external input; or
- measure a characteristic of the apparatus associated with the current parameter.

13. A method for processing an input beam, the method comprising:
- transmitting the input beam from at least one port of a plurality of ports, the ports being separated by port spacing;
- dispersing the input beam into optical channels with a dispersion element;
- storing a plurality of holograms, each of the holograms associated with a defined parameter, each of the holograms configured to create a reconfigurable phase grating profile of individually addressable pixels of a switch assembly;
- selecting at least one of the holograms based on the defined parameter; and
- selectively directing a portion of one or more diffracted beams of one or more of the optical channels relative to one or more of the ports by individually addressing the pixels of the switch assembly according to the at least one selected hologram;
- wherein selecting at least one of the holograms based on the defined parameter comprises:
- select at least two of the holograms having the defined parameters associated on both sides of an intermediate value;
- interpolating an intermediate hologram between at least two selected holograms; and
- controlling the switch assembly based on the intermediate hologram.

14. The method of claim 13, wherein one or more of the reconfigurable phase grating profiles include phase values for the individually addressable pixels having non-uniform steps in a blazing phase pattern.

15. The method of claim 13, wherein selectively directing the portion of the one or more diffracted beams of the one or more of the optical channels from the switch assembly relative to the one or more of the ports comprises:
- selectively directing at least a first order of the one or more diffracted beams from the switch assembly for output to selected one or more of the ports; and
- selectively directing at least a higher order of the one or more diffracted beams from the switch assembly away from the ports.

16. The method of claim 13, wherein selectively directing the portion of the one or more diffracted beams of the one or more of the optical channels from the switch assembly relative to the one or more of the output ports comprises attenuating the portion to a targeted attenuation level as the defined parameter.

17. The method of claim 13, wherein selecting at least one of the holograms based on the defined parameter comprises:
obtaining a current parameter;
finding at least one of the holograms stored in memory having the defined parameter that is at least associated with the current parameter; and
retrieving the at least one hologram found in memory.

18. A method for processing an input beam, the method comprising:
transmitting the input beam from at least one port of a plurality of ports, the ports being separated by port spacing;
dispersing the input beam into optical channels with a dispersion element;
storing a plurality of holograms, each of the holograms associated with a defined parameter, each of the holograms configured to create a reconfigurable phase grating profile of individually addressable pixels of a switch assembly;
selecting at least one of the holograms based on the defined parameter; and
selectively directing a portion of one or more diffracted beams of one or more of the optical channels relative to one or more of the ports by individually addressing the pixels of the switch assembly according to the at least one selected hologram;
wherein selecting at least one of the holograms based on the defined parameter comprises:
obtaining a current parameter;
finding at least one of the holograms stored in memory having the defined parameter that is at least associated with the current parameter; and
retrieving the at least one hologram found in memory;
wherein finding at least one of the holograms stored in memory having the defined parameter that is at least associated with the current parameter comprises finding at least two of the holograms having the defined parameters associated on both sides of the current parameter, the method further comprising:
interpolating an intermediate hologram between the at least two selected holograms; and
control the switch assembly based on the intermediate hologram.

19. The method of claim 18, wherein obtaining the current parameter comprises:
retrieving the current parameter from memory;
receiving the current parameter from an external input;
measuring a value associated with the current parameter.

20. A method of configuring a module to process an input beam, the method comprising:
modeling a plurality of ports and a switch assembly of the module, the switch assembly arranged in optical communication with optical channels, the switch assembly being liquid crystal based and having a plurality of pixels, the pixels being individually addressable;
determining a plurality of holograms for operating the switch assembly, each of the holograms associated with a defined parameter and each configured to create a reconfigurable phase grating profile of the pixels, by iteratively simulating diffractions of the optical channels from the switch assembly with the reconfigurable phase grating profile, comparing each of the simulated diffractions against a target performance at the defined parameter, and adjusting the reconfigurable phase grating profile of the pixels based on the comparison; and
storing the plurality of determined holograms with the defined parameters associated therewith as data accessible by the module;
wherein determining the plurality of holograms comprises:
selecting at least two of the holograms having the defined parameters associated on both sides of an intermediate value;
interpolating an intermediate hologram between at least two selected holograms;
comparing the simulated diffractions for the intermediate hologram against the target performance at the intermediate; and
accepting the at least two holograms for storage based on the comparison.

21. The method of claim 20, wherein one or more of the reconfigurable phase grating profiles of the determined holograms include phase values for the pixels having non-uniform steps in a blazing phase pattern.

22. The method of claim 20, comprising configuring the module to select a given one of the stored holograms in the accessible data based on the defined parameter.

23. The method of claim 20, wherein adjusting the reconfigurable phase grating profile of the pixels based on the comparison comprises adjusting the reconfigurable phase grating profile of the pixels to:
selectively direct at least a first order of the diffractions from the switch assembly for output to selected one or more of the ports; and
selectively direct at least a higher order of the diffractions from the switch assembly away from the ports.

24. The method of claim 20, wherein adjusting the reconfigurable phase grating profile of the pixels based on the comparison comprises adjusting the reconfigurable phase grating profile of the pixels to attenuate portions of the diffractions to targeted attenuation levels as the defined parameters.

25. A method of configuring a module to process an input beam, the method comprising:
modeling a plurality of ports and a switch assembly of the module, the switch assembly arranged in optical communication with optical channels, the switch assembly being liquid crystal based and having a plurality of pixels, the pixels being individually addressable;
determining a plurality of holograms for operating the switch assembly, each of the holograms associated with a defined parameter and each configured to create a reconfigurable phase grating profile of the pixels, by iteratively simulating diffractions of the optical channels from the switch assembly with the reconfigurable phase grating profile, comparing each of the simulated diffractions against a target performance at the defined parameter, and adjusting the reconfigurable phase grating profile of the pixels based on the comparison; and
storing the plurality of determined holograms with the defined parameters associated therewith as data accessible by the module;
wherein simulating the diffractions of the optical channels from the switch assembly with the reconfigurable phase grating profile comprises blurring a stepped pattern of the reconfigurable phase grating profile in the simulation.

* * * * *